(12) United States Patent
Jaudon et al.

(10) Patent No.: US 8,854,663 B2
(45) Date of Patent: Oct. 7, 2014

(54) DYNAMIC PRINT SERVER GENERATION IN A DISTRIBUTED PRINTING ENVIRONMENT

(75) Inventors: Joe Jaudon, Sedalia, CO (US); David Lowrey, Denver, CO (US); Adam Williams, Aurora, CO (US)

(73) Assignee: Aventura HQ, Inc., Denver, CO (US)

( * ) Notice: Subject to any disclaimer, the term of this patent is extended or adjusted under 35 U.S.C. 154(b) by 436 days.

(21) Appl. No.: 13/276,060

(22) Filed: Oct. 18, 2011

(65) Prior Publication Data
US 2012/0092721 A1 Apr. 19, 2012

Related U.S. Application Data

(60) Provisional application No. 61/394,264, filed on Oct. 18, 2010.

(51) Int. Cl.
*G06F 3/12* (2006.01)
(52) U.S. Cl.
CPC ............... *G06F 3/12* (2013.01); *G06F 3/1204* (2013.01); *G06F 3/1225* (2013.01); *G06F 3/1288* (2013.01); *G06F 3/126* (2013.01); *G06F 3/122* (2013.01)
USPC ........................................................ 358/1.15

(58) Field of Classification Search
None
See application file for complete search history.

(56) References Cited

U.S. PATENT DOCUMENTS

| | | | | |
|---|---|---|---|---|
| 2007/0198656 A1* | 8/2007 | Mazzaferri et al. | ............ | 709/218 |
| 2009/0113458 A1* | 4/2009 | Finger et al. | ................... | 719/327 |
| 2010/0058093 A1* | 3/2010 | Danieli et al. | ................ | 713/340 |
| 2011/0075205 A1* | 3/2011 | Oomura | ....................... | 358/1.15 |

* cited by examiner

*Primary Examiner* — Jeremiah Bryar
(74) *Attorney, Agent, or Firm* — Holland & Hart LLP

(57) ABSTRACT

Methods, systems, and devices are described for dynamic print server generation in a distributed printing environment. A data store may store multiple operating systems. A central server computer system is in communication with the data store. The central server computer system may receive notification of a print job, select a printer for the print job, map a stored driver to the selected printer, select an operating system associated with the driver from the data store, and dynamically load the operating system associated with the driver to generate a print server for the print job.

20 Claims, 13 Drawing Sheets

| Printer | Driver | OS |
|---------|--------|------|
| A | $A_1$ | X, Y |
| B | $B_2$ | X, Y |
| C | $C_1$ | Y |
| D | $D_1$ | Z |

|  | $A_1$ | $A_2$ | $B_1$ | $B_2$ | $C_1$ | $D_1$ | $D_2$ |
|---|---|---|---|---|---|---|---|
| $A_1$ | X | | | | | | |
| $A_2$ | X | X | | | | | |
| $B_1$ | O | O | X | | | | |
| $B_2$ | O | O | X | X | | | |
| $C_1$ | X | X | O | O | X | | |
| $D_1$ | X | X | O | O | X | X | |
| $D_2$ | X | X | O | O | X | X | X |

DYNAMIC PRINT SERVER GENERATION IN A DISTRIBUTED PRINTING ENVIRONMENT

CROSS REFERENCES

The present application claims priority from U.S. Provisional Patent Application Ser. No. 61/394,264, which is incorporated herein by reference in its entirety for all it discloses.

BACKGROUND

Embodiments of the invention relate to computer network communication, and more particularly, printing in a dynamic roaming environment. Organizations often use a variety of computing devices. Various computer systems may use a thin-client or a virtual desktop display in conjunction with a centralized server or mainframe, and also use traditional workstations and handheld devices.

A thin-client may be a computing device that includes hardware, software, or both in a client-server architecture network. However, such a network may use a central server for processing and may transmit and receive input and output over a network or other communication medium established between the device and the remote server. In some examples, a thin-client device may run web browsers or remote desktop software, such that significant processing may occur on the server.

Printing in such environments may present a number of significant challenges. Traditionally, print drivers are stored and maintained on each device, and this can cause administrative overhead and maintenance issues. The problem may be exacerbated with mobile thin-clients and other mobile devices, as the number of drivers that may need to be stored can increase substantially as more printers become available.

There are also challenges related to selecting the right printer and print server in a dynamic environment. For example, with a mobile device or a roaming user, it may be a challenge to maintain print server support for legacy printers with drivers that may not be compatible with certain operating systems or other drivers. Thus, there may be a need in the art for novel system architectures to address one or more of these issues.

SUMMARY

Methods, systems, and devices are described for dynamic print server generation in a distributed printing environment.

In one set of embodiments, a distributed printing system includes a plurality of printers, a data store including a plurality of stored operating systems, and a central server computer system communicatively coupled to the data store. The central server computer system may receive a notification of a print job, select a printer from the plurality of stored printers for the print job, map a driver from the stored drivers to the selected printer, and select an operating system associated with the driver from the stored operating systems. The central server computer system dynamically loads the operating system associated with the driver to generate a print server associated with the print job.

In another set of embodiments, a method of printing in a distributed printing environment includes the steps of receiving a notification of a print job, selecting a printer from a number of printers for the print job, mapping a driver from a number of stored drivers to the selected printer, selecting an operating system associated with the driver from a number of stored operating systems, and dynamically loading the operating system associated with the driver to generate a print server associated with the print job.

In another set of embodiments, a central server computer system includes a receiving module, a printer selection module, a driver identification module, an operating system identification module, and an operating system loading module. The receiving module receives notification of a print job. The printer selection module selects a printer for the print job from a number of printers. The driver identification module maps a driver from a number of stored drivers to the selected printer. The operating system identification module selects an operating system associated with the driver from a number of stored operating systems, and the operating system loading module dynamically loads the selected operating system to generate a print server associated with the print job.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 8A is a diagram illustrating an example of a table of associations between printers, drivers, and operating systems, according to various embodiments of the invention.

FIG. 8B is a diagram illustrating an example of a table of compatibility among drivers, according to various embodiments of the invention.

DETAILED DESCRIPTION OF THE INVENTION

Figure 1:
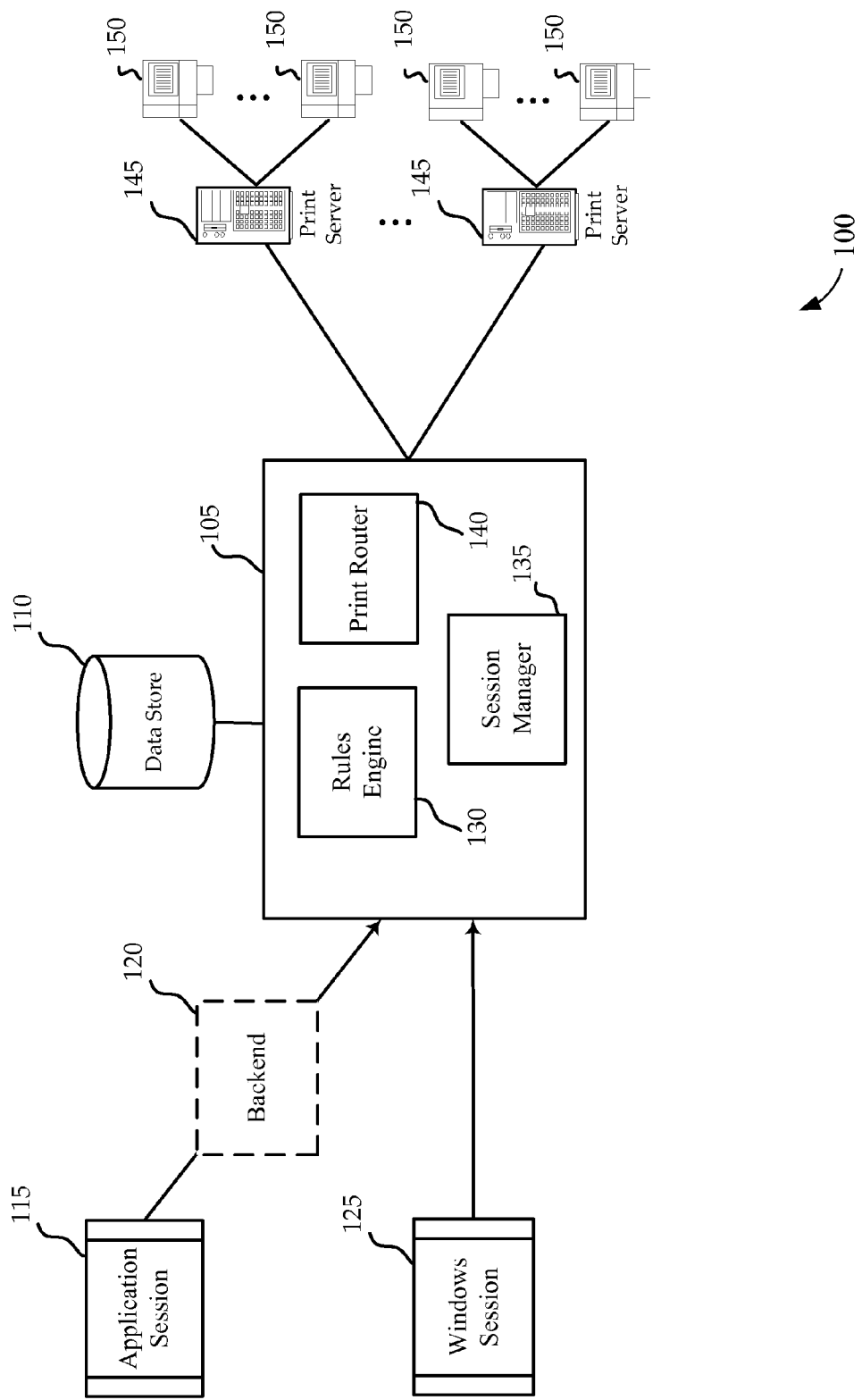
FIG. 1 is a block diagram illustrating a system for distributed printing in a dynamic roaming and traditional static environments, according to various embodiments of the invention.

The present description sets forth examples of systems, methods, and devices for dynamically generating print servers on demand in response to print jobs in a distributed printing environment. In these systems, methods, and devices, multiple operating systems are stored centrally. When notification of a print job is received, a printer is selected for the print job, and a stored driver is mapped to the selected printer. An operating system associated with the driver is then selected from the stored operating systems. The operating system associated with the driver is dynamically loaded to generate a print server associated with the print job.

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Systems, devices, methods, and software are described for dynamic print server generation within a distributed printing environment. In one set of embodiments, shown in FIG. 1, system 100 includes a central server computer system 105, a data store 110, print servers 145, and printers 150. Each of these components may be in communication with each other, directly or indirectly.

The central server computer system 105 may include a rules engine 130, a session manager 135, and a print router 140. The central server computer system 105 may be made up of one or more server computers, workstations, web servers, or other suitable computing devices. The central server computer system 105 may be fully located within a single facility or distributed geographically, in which case a network may be used to integrate different components.

The central server computer system 105 may receive a print job. The print job may be received from a windows session 125. Alternatively, the print job may be received from an application session 115 via a backend 120. The print job may also or alternatively be received from an application session 115 via a cloud computing environment (not specifically shown). The print job may be received from thin-clients (e.g., SUN RAY clients available from Oracle Corporation, WYSE clients available from Wyse Technology, etc.), thick clients (e.g., desktops, laptops), mobile devices, tablets, etc., although these devices are not specifically shown in the diagram Moreover, the print job may be received from any type of desktop or virtual desktop environment. Examples of suitable desktop environments from which the print job may be received include, but are not limited to, LINUX environments based on the open-source Linux kernel; WINDOWS environments based on software available from Microsoft, Inc.; OS/X environments based on software available from Apple, Inc.; VMWARE virtual environments based on software available from VMware, Inc.; CITRIX virtual environments based on software available from Citrix Systems, Inc.; Windows Terminal Services/Remote Desktop virtual environments based on software available from Microsoft, Inc.; ANDROID environments based on software available from Google, Inc.; IOS environments based on software available from Apple, Inc.; WEBOS environments based on software available from Hewlett Packard Company; combinations thereof; and the like. In some embodiments, the central server computer system 105 may receive notice or identification for a print job, and perform the functionality described herein based on such notice or identification only.

A set of drivers may be stored at data store 110. Data store 110 may be a single database, or may be made up of any number of separate and distinct databases. The data store 110 may include one, or more, relational databases or components of relational databases (e.g., tables), object databases, or components of object databases, spreadsheets, text files, internal software lists, or any other type of data structure suitable for storing data. Thus, it should be appreciated that a data store 110 may each be multiple data storages (of the same or different type), or may share a common data storage with other data stores. Although in some embodiments the data store 110 may be distinct from a central server computer system 105, in other embodiments it may be integrated therein to varying degrees.

As noted above, notification of a requested print job may be received at the central server computer system 105. A session manager 135 may receive the notification, and may assign a terminal identifier (TID) to a device requesting the job. The central server computer system 105 may identify information about the print job (e.g., identification and location of the applicable print server 145 and printer 150, and identification of the proper driver). Drivers for the print job may be transmitted to the appropriate print server 145 and to the client device requesting the job. The drivers may be installed, and the device and print server 145 may execute the print job with the installed drivers. Thus, the central server computer system 105 may access the data store 110 to distribute drivers to the print server 145 or the device, and thus in some embodiments the drivers do not need to be maintained on each device or print server 145. The drivers may be taken down or uninstalled after each job, set of jobs, or period with no use.

It should be understood that the print servers 145 may be any real or virtual machine or environment that hosts a print driver for controlling a printer 150. Thus, in certain examples a print server 145 may be implemented by circuitry, logic, and/or software within the printer 150. Additionally or alternatively, a print server 145 may include a real or virtual network server and/or a personal computing device in communication with a printer 150.

In some embodiments, the central server computer system 105 may use the information about a print job to identify an appropriate operating system (OS) and print driver for the print server for a given print job. The central server computer system 105 may access the data store 110 to retrieve the operating system and print driver, and build an operating system in real-time in response to receiving a print job. The central server computer system 105 may install the appropriate driver, thus creating a virtual print server (which may, but need not be, print server 145). The virtual print server executes the print job. After the print job is complete, the driver and operating system may be taken down.

In some embodiments, a printer 150 is selected (e.g., automatically or by a user). The print router 140 at the central server computer system 105 may receive the selection. At the print router 140, the selected printer may be mapped to a 1) driver of a table of drivers, and 2) a print server 145 of a table of print servers. In certain examples, this mapping may be performed based on static relationships between printers, drivers, and print servers. For example, these static relationships may be stored as tables within the data store 110.

Additionally or alternatively, a rules engine 130 at the central server computer system 105 may be used in the selection of the printer. The rules engine 130 may be configured to dynamically map a print job to a print server 145 and printer 150 for the print job. By way of example, upon notification or receipt of the print job, the rules engine 130 may access a set of rules to determine the correct print server 145 and printer 150 for the print job. The rules may dynamically make this determination based on the location of the device. The type of device, attributes of the print job, and other factors may be used by the rules engine 130 to determine the correct type and location for the print server 145 and printer 150. This rules engine 130 functionality may not be necessary in all embodiments of the invention to identify an appropriate printer 150, print server 145, or driver for a print job. Accordingly, the rules engine 130 may be eliminated from certain embodiments.

In some embodiments, feedback from a printer 150 is received at the print server 145, and then forwarded on to a print router 140. The print router 140 may route the feedback (e.g., job failed, out of ink, out of paper, etc.) to the client device. This report may be in the form of a dialogue box. The feedback may be routed to avoid the backend 120, even when the print job is initially routed through the backend 120. In response to feedback from a print router 140, a client device may direct or route a print job. This routing may be to a new printer, or may call up alternative functionality (e.g., a new tray) for a printer that is already in use. Thus, instead of unidirectional printing, print jobs (e.g., sent through a backend 120) may be controlled by two-way communication between the print router 140 and the device.

The components of the system 100 may be directly connected, or may be connected via a network (not shown), which may be any combination of the following: the Internet, an IP network, an intranet, a wide-area network ("WAN"), a local-area network ("LAN"), a virtual private network, the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically. If no specific means of connection is noted, it may be assumed that the link, communication, or other connection between devices may be via a network.

Session manager 135 may include an API architecture which serves as the communication control point, managing virtual desktop sessions and brokering sessions for clients to backend 120 virtual desktop and application sessions. The session manager 135 may broker and pass through mechanisms for client devices to active virtual sessions. The central server computer system 105 may include a centralized management console (not shown), which may be a web-based management console for configuration, real time monitoring, and reporting. There may be management capabilities for the entire virtual desktop/application environment.

Figure 2:
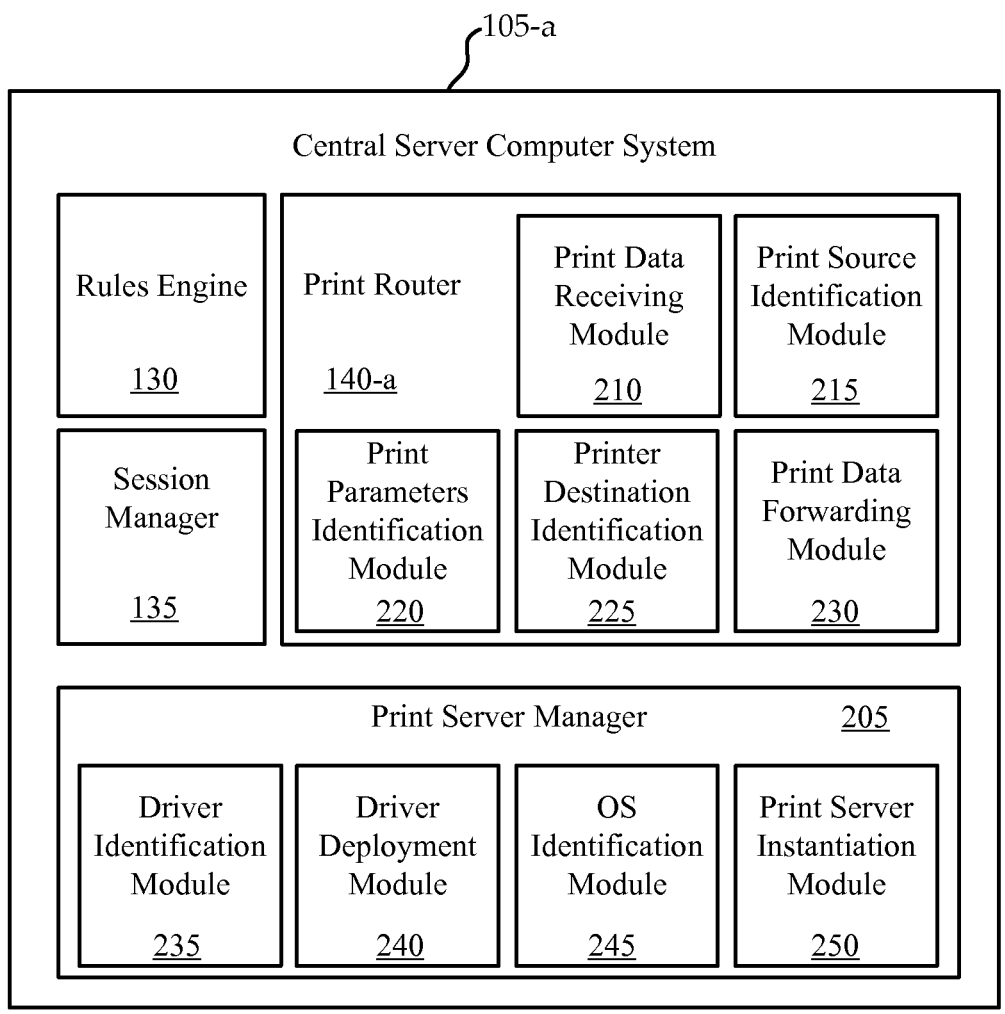
FIG. 2 is a block diagram illustrating a central server computer system in a system for distributed printing in a dynamic roaming and traditional static environments, according to various embodiments of the invention.

FIG. 2 shows a block diagram of a central server computer system 105-a. The central server computer system 105-a may be one example of the central server computer system 105 in FIG. 1. The central server computer system 105-a shown in FIG. 2 includes a rules engine 130, a session manager 135, a print router 140-a, and a print server manager 205. The rules engine 130 and the session manager 135 shown in FIG. 2 may be substantially the same as the rules engine 130 and the session manager 135 shown in FIG. 1. The print router 140-a may be one example of the print router 140 shown in FIG. 1.

The print router 140-a may match print jobs received from external sessions 115, 125 to one or more destination printers 150 and/or print servers 145. To accomplish these tasks, the print router 140-a may include at least a print data receiving module 210, a print source identification module 215, a print parameters identification module 220, a printer destination identification module 225, and a printer feedback routing module 230.

The print data receiving module 210 may be configured to receive print data corresponding to a print job from an external session 115, 125 via a communication channel established by the session manager 135. In certain embodiments, the print data received from the external session 115, 125 may be in the form of one or more page description languages (PDLs). Examples of page description languages that may be received at the receiving module 210 include, but are not limited to, PostScript, Portable Document Format (PDF), Printer Command Language (PCL), Scalable Vector Graphics (SVG), Open XML Paper Specification (XPS), and any other page description language that may suit a particular implementation of the principles described herein.

In other embodiments, the print data received from the external session 115, 125 may be in the form of text or images for use with a standard template stored by a print server 145 or a printer 150. For example, the print data may be used to print a personalized bracelet worn by a patient in a medical facility. In this example, the print data may include text corresponding to the name of the patient, and the name of the patient's doctor. This text, when received by a print server 145 or a printer 150, may be applied to a standard bracelet template to print a bracelet having the name of the patient and the name of the patient's doctor.

In additional or alternative embodiments, the print data received by the print data receiving module 210 may be in the form of an image that has already been rasterized by the external session 115, 125 in preparation for delivery to a printer 150.

The print data receiving module 210 may be configured to cache the received print data at a designated storage area. In certain examples, the designated storage area may be in a data store 110. The cached print data may be accessible to the rules engine 130 or any other module or process.

The print source identification module 215 may be configured to analyze the received print data to determine certain attributes or characteristics of the received print data. These attributes or characteristics may also be stored for use by the other modules or processes. For example, the print source identification module 215 may associate the received print data with a format in the data store 110. This format information may be available to the rules engine 130 for use in enforcing one or more rule sets.

In certain examples, the print source identification module 215 may analyze the print data received by the print data receiving module 210 to determine a source of the print data.

By way of example, the source may be determined using information from the session manager 135, information acquired by the print data receiving module 210, and/or information attached to the print data itself by the source. Once the print source has been identified, the identity of the print source may be associated with the received print data. For example, the identity of the print source may be stored in the data store 110.

The print parameters identification module 220 may identify certain print parameters for the received print data. These print parameters may be included with the received print data and/or determined by logical deduction (e.g., using the rules engine 130). For instance, a user of an external session 115, 125 may specify a particular print parameter which may be transmitted to the central server computer system 105-a with the print data or logically deduced from the received print data. Additionally or alternatively, certain default print parameters may be determined for the print data based on the identity of the source of the print data and/or another attribute associated with the print data.

Examples of print parameters that may be identified by the print parameters identification module 220 include, but are not limited to, a selected type of printing media, a selected size of printing media, a selected source of printing media, an ink or toner color setting, a collation setting, a staple setting, a duplex setting, a scaling setting, combinations thereof, and the like.

The printer destination identification module 225 may be configured to identify an appropriate destination printer 150 and/or print server 145 for print data received at the print data receiving module 210. The printer destination identification module 225 may identify the appropriate destination printer 150 based on one or more attributes of the print data. In certain examples, the printer destination identification module 225 may pass certain attributes of the print data (e.g., the identity and/or location of the source of the print data determined by the print source identification module 215, the print parameters determined by the print parameters identification module 220, etc.) to the rules engine 130.

The rules engine 130 may apply a certain set of predetermined or dynamically updated rules to the input it receives from the printer destination identification module 225 to determine the destination printer 150 and/or print server 145 for the print data. The destination printer 150 and/or print server 145 determined by the rules engine 130 may then be returned to the printer destination identification module 225.

Alternatively, instead of using a rules engine 130, the printer destination identification module 225 may identify the appropriate destination printer 150 based on static associations between certain attributes and certain destination printers 150.

Once the destination printer 150 and/or print server 145 has been identified for the print data, the print data forwarding module 230 may be configured to forward the print data on to the identified printer 150 and/or print server 145. The print data may be forwarded over a local connection and/or over a network or logical connection. Additionally, in certain examples, the print data forwarding module 230 may be configured to receive feedback from a printer 150 and/or a print server 145 about a specific print job and process the feedback and/or forward the feedback to a third party, such as the source of that particular print job.

The print server manager 205 of the central server computer system 105-a may handle certain aspects related to the distribution of drivers for printers to the print servers 145 and the general maintenance of the print servers 145. Accordingly, the print server manager 205 may include a driver identification module 235, a driver deployment module 240, an operating system identification module 245, and a print server instantiation module 250.

The driver identification module 235 may, in response to a set of print data being assigned to a particular printer 150, determine an appropriate driver for that printer 150. As described above with regard to FIG. 1, the appropriate driver may be selected from a central repository of drivers stored, for example, at data store 110. The driver identification module 235 may be further configured to determine whether an appropriate driver for the selected printer 150 is already installed on a print server 145 chosen to send the print data to the selected printer 150. In certain examples, the driver identification module 235 may compare a version of the driver stored by the chosen print server 145 with a version of the driver stored at the central repository to determine whether the driver stored by the chosen print server 145 is current.

In the event that a determination is made that the chosen print server 145 does not have the appropriate driver or a correct version of the appropriate driver, the driver deployment module 240 may install the appropriate driver on the print server 145. In certain examples, the driver deployment module 240 may access and write to storage associated with the print server 145 via a local connection, network connection, and/or a logical connection to install the appropriate driver to the print server 145.

The operating system identification module 245 may be configured to identify an appropriate operating system associated with an appropriate driver for the selected printer 150. In the event that a print server 145 running the appropriate operating system and in communication with the selected printer 150 does not exist or is unavailable, the print server instantiation module 250 may instantiate a new print server 145. The newly instantiated print server 145 may be created on a dedicated or virtual machine by loading the appropriate operating system to the dedicated or virtual machine. In certain examples, an operating system image having the appropriate driver preinstalled may be used to instantiate the new print server 145.

Figure 3:
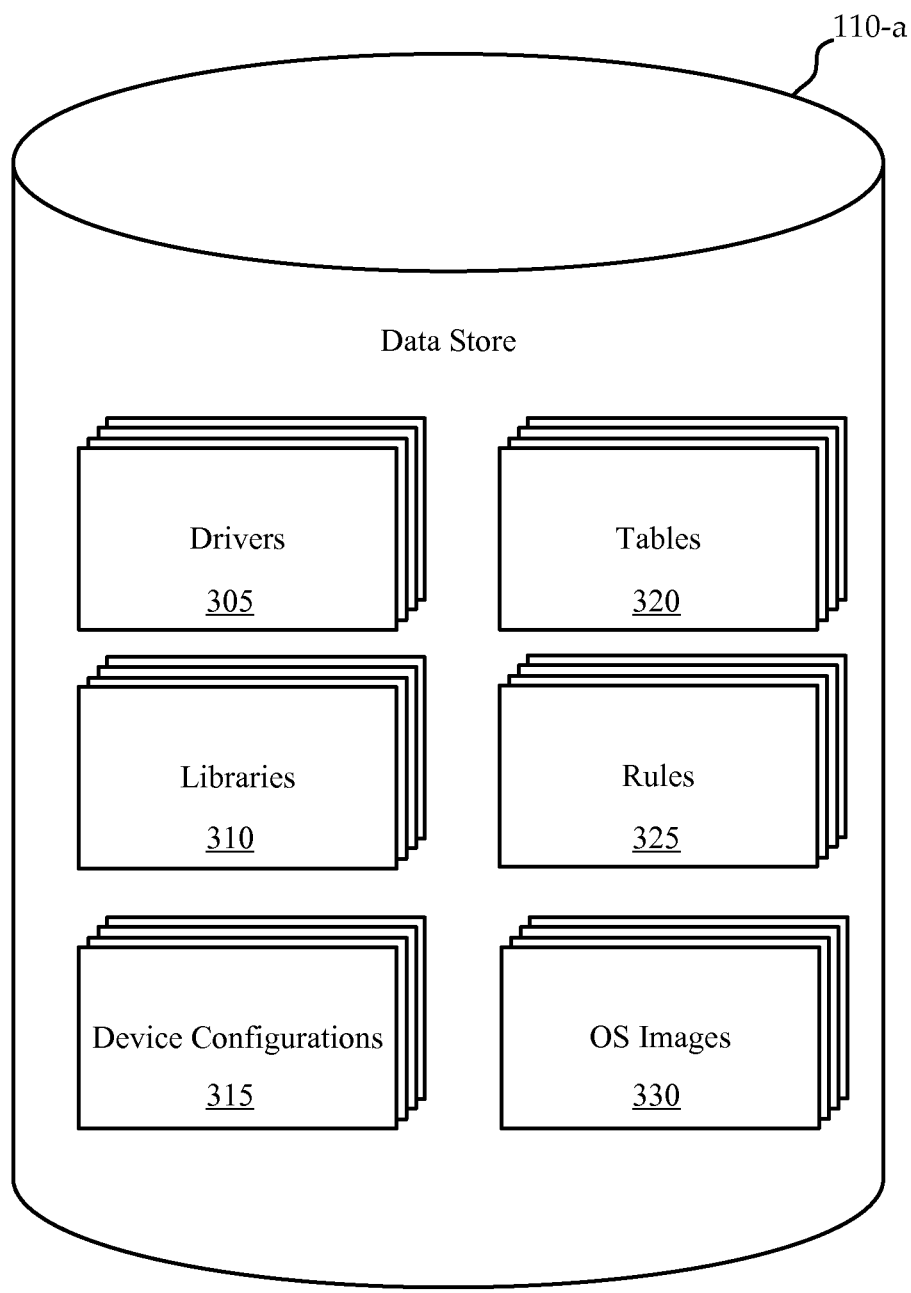
FIG. 3 is a block diagram illustrating a data store in a system for distributed printing in a dynamic roaming and traditional static environments, according to various embodiments of the invention.

FIG. 3 is a block diagram of one example of a data store 110-a that may be associated with a central server computer system 105. The data store 110-a shown in FIG. 3 may be an example of data store 110 shown in FIG. 1. As shown in FIG. 3, data store 110-a may store drivers 305, libraries 310, device configurations 315, tables 320, rules 325, and operating system images 330.

Data store 110-a may maintain a repository of drivers 305 for various printers 150 supported by a distributed printing system 100. In accordance with the description of FIGS. 1-2, as a print job is received at the central server computer system 105, the central server computer system 105 may associate the print job with a specific printer 150, dynamically access the data store 110 to retrieve a driver 305 appropriate for the specific printer, and provide the retrieved driver 305 to a print server 145 associated with the specific printer.

Because the drivers 305 are stored centrally at data store 110-a, individual machines implementing sessions 115, 125 and individual print servers 145 need not store a local print driver for each printer supported by the system 100. Moreover, as updated versions of drivers 305 become available, a network administrator may make the updated versions available to each print server 145 in the system by simply updating the repository of drivers 305 stored at the data store 110-a, thereby avoiding the need to roll out driver updates to each print server 145 separately.

The data store 110-a may also store software libraries 310. For example, the data store 110-a may store libraries 310 associated with the drivers 305. In certain embodiments, the libraries 310 may include Dynamic-Link Library (DLL) or Dynamic Shared Object (DSO) files that allow the print servers 145 to dynamically communicate with the sessions 115, 125 which generate the print jobs sent to printers 150. Thus, where the central server computer system 105 provides a driver 305 to a print server 145 for a specific printer 150, the central server computer system 105 may include with the driver 305 one or more DLL files for that printer 150. The DLL(s) files may allow the print server 145 to provide feedback to a session 125 from which a print job originates in a way that is understandable to the session 125. For instance, if a user of the session 125 generates the print job using a print Graphical User Interface (GUI), the DLL transmitted to the print server 145 may allow the print server 145 to provide feedback to the user of the session 125 through the print GUI.

By way of example and not limitation, consider the case where a print job generated by a session 125 has been sent to a print server 145 for printing by a specific printer 150, and that the printer 150 is out of paper. The printer 150 may send a feedback message to the print server 145 indicating that the printer 150 is out of paper, and the print server 145 may provide this feedback message to a print dialog window in the session 125 using a DLL received from the central server computer system 105. This process may allow for a more seamless printing experience for a user of session 125, despite the fact that the session 125 may not locally store a print driver or DLL for communicating with the printer 150.

In certain examples, the data store 110-a may also store device configurations 315, such as settings configurations for printers 150. Thus, when the central server computer system 105 transmits a print job to a print server 145 associated with a specific printer 150, the central server computer system 105 may also include in the transmission a configuration 315 retrieved from the data store 110-a for that printer 150. The configuration 315 may specify, for example, settings such as printer margin settings, duplex settings, paper tray settings, ink color settings, collation settings, and the like. The configuration 315 transmitted to the print server 145 by the central server computer system 105 may be specific to the printer 150, the session 115, 125 generating the print job, and/or the character or content of the print job itself.

Additionally, the data store 110-a may store and maintain various tables 320. The tables 320 may reflect certain relationships present in the system 100. For example, the tables 320 may include one or more tables 320 associating specific sessions 115, 125 with terminal identifiers or node identifiers, one or more tables 320 associating specific sessions 115, 125 with physical locations, one or more tables 320 associating specific printers 150 or print servers 145 with physical locations, one or more tables 320 associating specific sessions 115, 125 with default printers 150, and/or one or more tables 320 tracking any other association in the system 100 that may suit a particular implementation of the principles described herein.

In certain examples, two or more of the tables 320 stored by the data store 110-a may be interrelated in such a way that allows for logical deductions in routing print jobs to print servers 145 or other useful purposes. For instance, the data store 110-a may include: a) a first table 320 associating each terminal identifier at a port with a particular session 115, 125 at a specific physical location; and b) a second table 320 associating each physical location for a session 115, 125 with a default printer 150. In this case, the information in the first table 320 and the second table 320 may be used by the central server computer system 105 to associate a print job received at a port with a specific default printer 150.

The data store 110-a may also include one or more rules 325 for use by the central server computer system 105 in routing received print jobs to print servers 145 and printers 150. As noted above in the description of FIGS. 1-2, the rules engine 130 of the central server computer system 105 may be configured to dynamically map a print job to a print server 145 and printer 150 for the print job by accessing the set of rules 325 stored in the data store 110-a. The rules 325 may take into account factors such as the location of the device generating the print job, the type of device generating the print job, attributes of the print job, and other factors. Some of these factors may be stored in the tables 320.

Additionally, the data store 110-a may include one or more operating system images 330. The operating system images 330 may be used, for example, in the dynamic creation of print servers 145. As described above, certain drivers 305 may not be compatible with the standard operating systems executed by typical print servers 145 in the system 100. Accordingly, when a print job is indicated for a printer 150 using one of these drivers 305, the central server computer system 105 may retrieve a compatible operating system image 330 from the data store 110-a and instantiate a new print server 145 by loading the operating system image 330 onto a real or virtual machine. The newly instantiated print server 145 may then receive the print job from the central server computer system 105 and control the indicated printer 150 using the appropriate driver 305 to complete the print job.

Figure 4:
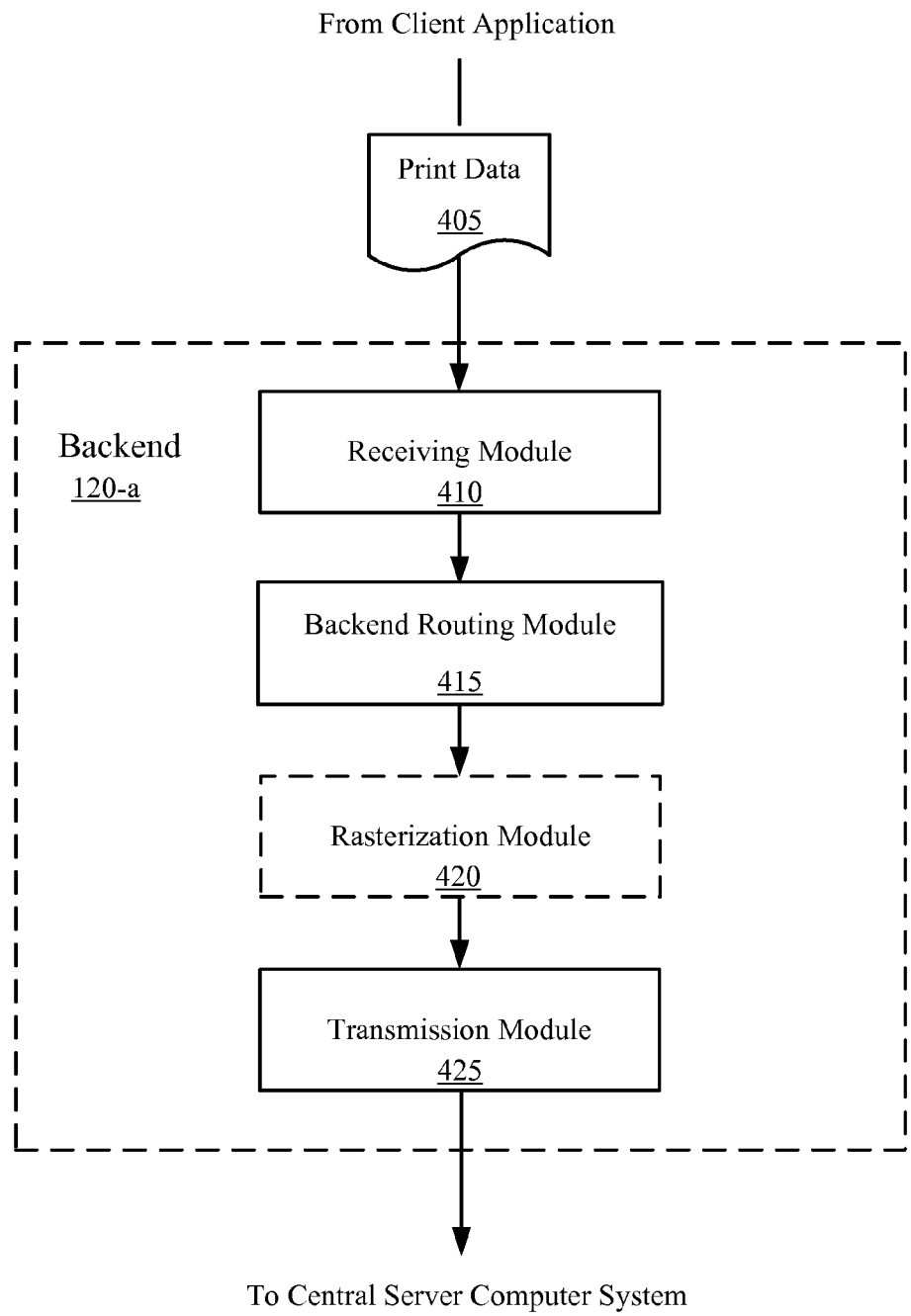
FIG. 4 is a block diagram illustrating a backend in a system for distributed printing in a dynamic roaming and traditional static environments, according to various embodiments of the invention.

Turning now to FIG. 4, a block diagram is shown of an illustrative backend 120-a for use in a distributed printing system 100. The backend 120-a shown in FIG. 3 may be an example of the backend 120 shown in FIG. 1. The backend 120-a may be configured to forward print data 405 to a next destination in the printing pipeline, such as a central server computer system 105, a print server 145, or a printer 150, as described in more detail below. To accomplish this functionality, the backend 120 may include a receiving module 410 to receive the print data 405 from an application session 115, a backend routing module 415 for determining the next destination of the print data 405, and a transmission module 425 to transmit the print data 405 to the determined next destination. In some examples, the backend 120-a may also include a rasterization module 420 for rasterizing the print data 405 prior to transmitting the print data 405 to the central server computer system 105.

The receiving module 410 of the backend 120-a may be configured to receive the print data 405 over a channel of communication with the application session 115. In some examples, the channel of communication may include one or more local connections (e.g., serial ports, parallel ports, etc.) between the backend 120-a and a device implementing the application session 115. Additionally or alternatively, the channel of communication may include one or more network connections (e.g., Ethernet, WiFi, etc.) and/or logical connections (e.g., where the receiving module 410 of the backend 120-a and the application session 115 are implemented by the same physical machine).

In addition to receiving the print data 405, the receiving module 410 may also identify the application session 115 providing the print data 405. For example, the receiving module 410 may monitor a number of ports associated with various application sessions 115. Each of the application sessions 115 may be assigned a terminal identifier or a node identifier. Thus, when print data 405 is received, the receiving module 410 may take note of the terminal identifier, the node identifier, and/or the port on which the print data is received to associate the print data 405 with a known application session.

The backend routing module 415 may determine the next destination of the print data 405 based on the application session 115 from which the print data 405 was received. To this end, the destination identification module 415 may maintain a table associating specific application sessions 115 with specific destinations. In certain examples, such as in the system 100 of FIG. 1, all print data 405 received at the backend 120-*a*, regardless of source, may be transmitted by the backend 120-*a* to a single central server computer system 105.

In alternative examples, the backend 120-*a* may be communicatively coupled to a number of separate central server computer systems 105 such that print data 405 from different application sessions 115 is transmitted by the backend to different central server computer systems 105. In additional or alternative examples, the backend 120-*a* may be communicatively coupled to one or more central server computer systems 105 in addition to one or more print servers 145 such that print data 405 from some application sessions 115 is transmitted to a central server computer system 105 and print data 405 from other application sessions 115 is transmitted directly to a print server 145. In these examples, the backend routing module 415 may determine the next destination of each instance of print data 405 based on the application session 115 from which the print data 405 was received.

In certain examples, the backend routing module 415 may further include logic for dynamically determining in real-time how a print job is to be routed. For example, based on certain characteristics of the print data 405, the backend routing module 415 may determine that it would be more appropriate to forward the print data 405 to a central server computer system 105 than to a print server 145 or printer 150. Additionally or alternatively, in examples where the backend 120-*a* is communicatively coupled to multiple alternative central server computer systems 105, the backend routing module 415 may perform load balancing in its distribution of different print jobs between the separate central server computer systems 105.

As mentioned above, in certain embodiments the backend 120-*a* may include a rasterization module 420. The rasterization module 420 may convert the received print data 405 into a raster image that can be understood by a printer. In other embodiments, the print data 405 may already have been rasterized by the application session 115 from which the print data 405 was received. In still other embodiments, the print data 405 may be rasterized at a print server 145 prior to printing.

The transmission module 425 of the backend 120-*a* may transmit the received print data 405 to the destination determined by the next destination identification module 415. This transmission may occur over one or more local connections (e.g., serial ports, parallel ports), one or more network connections (e.g., Ethernet, WiFi), and/or one or more logical connections (e.g., where the backend 120 and the next destination are implemented by the same physical machine).

Figure 5:
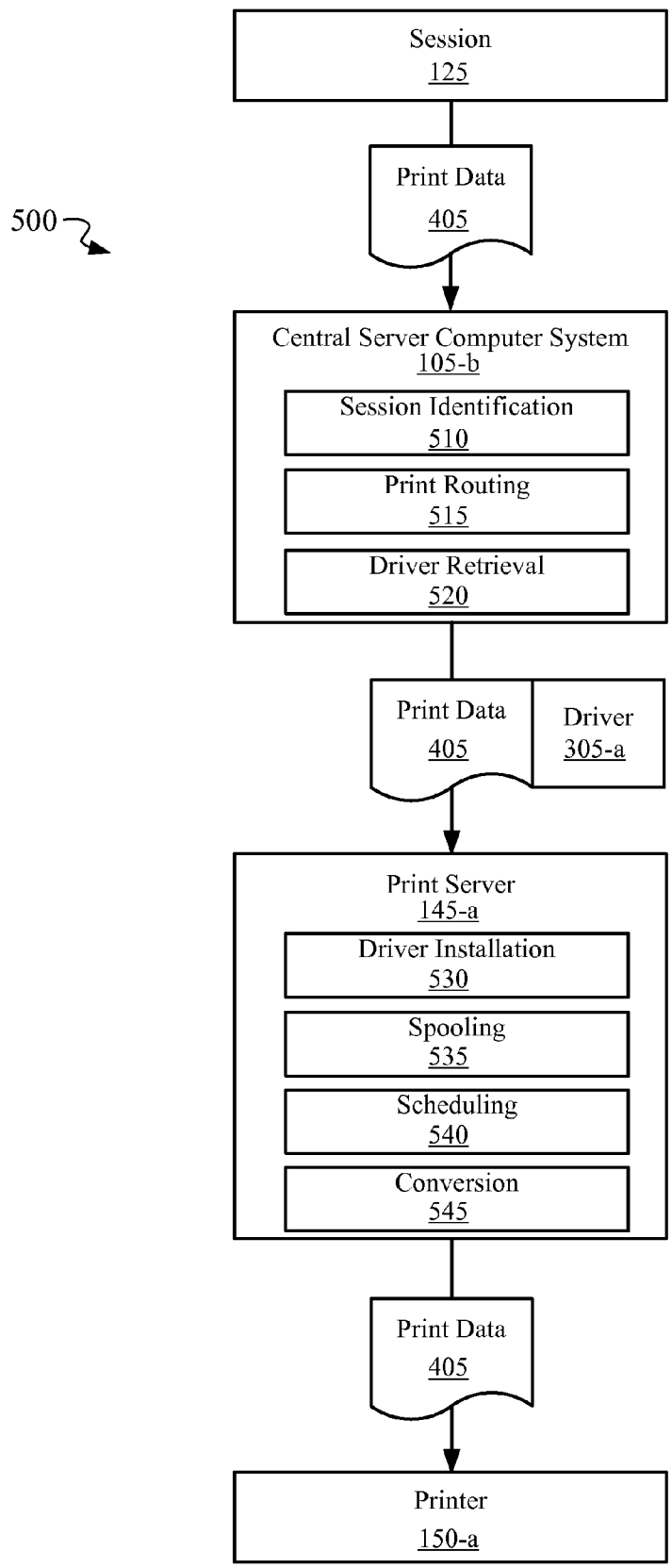
FIG. 5 is a block diagram illustrating a logical path taken by print data in a system for distributed printing in a dynamic roaming and traditional static environments, according to various embodiments of the invention.

FIG. 5 illustrates a diagram of one illustrative path 500 of print data 405 through a distributed printing system. The print data 405 may first be generated and transmitted to a central server computer system 105-*b* by a session 125. The central server computer system 105-*b* may be an example of the central server computer system 105 of FIG. 1 or FIG. 2. The session 125 may include an application executed by a host device. In certain examples, a user of the application issues a command to print data generated or hosted by the application.

In certain embodiments, the session 125 may transmit the print data 405 directly to the central sever computer system 105-*b*. Alternatively, the session 125 may utilize a backend 120 to transmit the print data 405 to the central server computer system 105. The central server computer system 105-*b* may perform session identification 510 to determine the source of the print data 405. For example, the central server computer system 105-*b* may look up a terminal identifier and/or a port associated with the print data 405 in a table to identify a device from which the print data 405 originated.

Once the source of the print data 405 is known, the central server computer system 105-*b* may perform print routing 515 on the print data 405 to select an appropriate printer 150-*a* for the print data 405. The printer 150-*a* may be an example of one of the printers 150 shown in FIG. 1. The print routing 515 may include applying a set of rules to one or more parameters associated with the print data 405 and/or the identified session 125. Additionally, the central server computer system 105-*b* may retrieve 520 an appropriate driver 305-*a* for the identified printer 150-*a* from a data store 110. The driver 305-*a* may be transmitted, together with the print data 405, from the central server computer system 105-*b* to a print server 145-*a* associated with the identified printer 150-*a*. The print server 145-*a* may be an example of the print server 145 shown in FIG. 1. In certain examples, as described above, the print server 145-*a* may be dynamically instantiated in response to a particular printer 150-*a* being selected for the print data 405.

The print server 145-*a* may install 530 the driver 305-*a* received from the central server computer system 105-*b* to enable the print server 145-*a* to communicate with the selected printer 150-*a*. Additionally, the print server may perform spooling 535 operations to receive and collect the print data 405, scheduling 540 operations to schedule the print data 405 for printing by the printer 150-*a*, and one or more conversion 545 operations to transform the print data into a format understood by the printer 150-*a*. In certain examples, the conversion 545 operations may include rasterization of the print data 405. The print server 145-*a* may then transmit the print data 405 to the selected printer 150-*a* over a local connection, a network connection, and/or a logical connection for printing.

It is worth noting that while an entire distributed printing system 100 has been described as a whole for the sake of context, the present specification is directed to methods, systems, and apparatus that may be used with, but are not tied to the system 100 of FIGS. 1-5. Individual aspects of the present specification may be broken out and used exclusive of other aspects of the foregoing description. This will be described in more detail, below.

In one set of embodiments, a host computer system receives a print job (e.g., receiving the print data), and uses the received information to select a printer for the print job. The host maps a print driver to the selected printer and selects an operating system (OS) associated with the print driver. The host loads an operating system in real-time in response to receiving a print job, and installs the appropriate driver, thus creating a virtual print server. The virtual print server executes the print job. After the print job is complete, the driver and operating system may be uninstalled.

Figure 6:
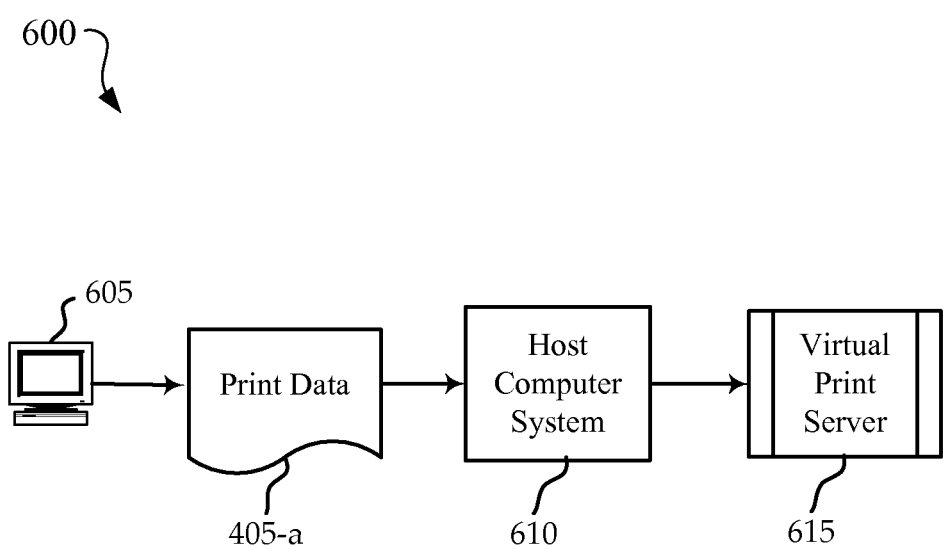
FIG. 6 is a diagram illustrating an example of a system for dynamic print server generation in a distributed printing environment, according to various embodiments of the invention.

FIG. 6 illustrates an example of a system 600 for dynamic print server generation on demand according to various embodiments of the invention. The system 600 includes a device 605, a host computer system 610, and a virtual print server 615. Each of these components may be in communication with each other, directly or indirectly. This system 600 may be an example of the systems 100 described with reference to FIG. 1, and the host computer system 610 may be central server computer system 105 of FIG. 1, 2, or 5. The virtual print server 615 may be a print server 145 of FIG. 1, 2, or 5, implemented at the host computer system 610 or at another host device.

A device 605 may transmit print data 405-*a* for a print job. The print data 405-*a* may include the image data for the print job and/or metadata (including, for example, device 605 type and identification, device 605 location, application information, printer location, and other data). In other embodiments, the image data and metadata associated with a device 605 may, in whole or in part, come from sources other than the device 605. The print data 405-*a* may be received by the host computer system 610.

Using the print data 405-*a*, the host computer system 610 may determine or select the destination printer. The host computer system 610 may use the identified printer information to determine the appropriate print server driver. The host computer system 605 may identify and retrieve the operating system file(s), driver file(s), registry and configuration file(s), and any other file(s) that may be used to generate the appropriate print server driver. These files may be retrieved from a data store (e.g., data store 300 of FIG. 1 or 3) implemented in the host computer system 610 or in communication with the host computer system 610.

The host computer system 610 may use the retrieved operating system files to load an operating system in real-time in response to receiving print data 405-*a*, utilizing the retrieved registry and configuration file(s). The operating system may be loaded, for example, to storage associated with a virtual machine implemented by the host computer system 610. The host computer system 610 may install the appropriate print server driver and/or any applicable print server applications, thus creating a virtual print server 615 residing on the host computer system 610. The virtual print server 615 may execute the print job, formatting the print data 405-*a* and forwarding the print data 405-*a* to a selected printer. After the print job is complete, the driver and operating system may be uninstalled. Thus, the host computer system 610 may use received print data 405-*a* for a print job in creating a virtual print server 615 with the appropriate driver for the job, and take the virtual print server down after each job. In other embodiments, the virtual print server 615 may be maintained for extended periods (for example, remaining until usage for the virtual print server 615 is inactive for a period exceeding a configurable threshold). In some embodiments, only portions of the virtual print server 615 are taken down after each print job or set of jobs.

It should be understood that while the system 600 of FIG. 6 creates a virtual print server 615 residing on the host computer system 610, the operating system and applicable files associated with the selected printer and driver may be alternatively be loaded onto dedicated hardware to create a print server in a non-virtualized environment using the above principles.

Figure 7:
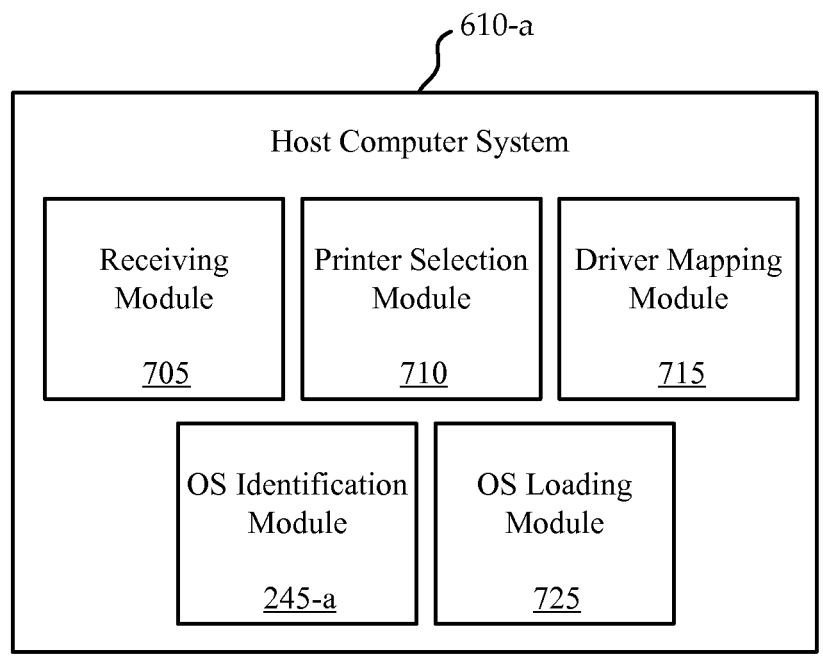
FIG. 7 is a block diagram illustrating an example of a host computer system in a system for dynamic print server generation, according to various embodiments of the invention.

Referring next to FIG. 7, a block diagram is shown illustrating a host computer system 610-*a* for dynamic on-demand print server generation according to various embodiments of the invention. The host computer system 610-*a* may be an example of the host computer system 610 described above with reference to FIG. 6, and/or of the central server computer system 105 described above with reference to FIG. 1, 2, or 5. The host computer system 610-*a* may include a receiving module 705, a printer selection module 710, a driver mapping module 715, an operating system identification module 245-1, and an operating system loading module 725. Each of these components may be in communication, directly or indirectly.

The receiving module 705 may be configured to receive a notification of a print job. This notification may be received from a device (e.g., device 605 of FIG. 6) in connection with print data (e.g., print data 405 of FIG. 5 or 6). For example, the receiving module 705 may receive notification of the print job when the host computer system 610-*a* receives the print data for the print job. In other examples, the receiving module 705 may receive a notification of the print job that is separate from the print data. In certain examples, the notification may be generated within the host computer system 610-*a* in response to the host computer system 610-*a* proactively discovering the print job.

The notification may be received using any means that may suit a particular application of the principles described herein. For example, the notification may be received by the receiving module 705 over a local connection (e.g., a serial or parallel port), a network connection (e.g., over a local area network or the Internet), or a logical connection (e.g., a communication channel implemented in software).

The printer selection module 710 may be configured to determine or select an appropriate printer (e.g., from printers 150 of FIG. 1 or 5) for the print job based on the received notification. The selection of the printer may be based on one or more attributes of the print job indicated by the received notification and/or other sources. For example, the printer may be selected based on one or more location considerations, a printer type, a print job type, time of day considerations, security considerations, and/or any other relevant factors. In certain examples, the functionality of the printer selection module 710 may be substantially implemented by the rules engine 130 and/or the print router 140 of FIG. 1 or 2.

The driver mapping module 715 may be configured to identify a suitable driver (e.g., driver 305 of FIG. 3) for the selected printer and map the driver to the selected printer. The driver may be selected based on a make or model of the selected printer, the print job type, and/or any other relevant factors. The driver may be selected from a repository of centrally stored drivers, as described above with reference to FIG. 1, 3, or 5. In certain embodiments, some or all of the functionality of the driver mapping module 715 may be substantially implemented by the rules engine 130 of FIG. 1 or 2, the print router 140 of FIG. 1 or 2, and/or the print server manager 205 of FIG. 2.

The operating system identification module 245-*a* may be configured to select an operating system (OS) associated with the driver selected for the print job. The operating system identification module 245-*a* may be an example of the operating system identification module 245 described above with regard to FIG. 2. The operating system may be selected for use in a dynamically generated print server for the print job.

The operating system identification module 245-*a* may access a repository of stored operating systems to select an operating system that is compatible and/or appropriate for use with the selected driver. The selected driver may be preinstalled on a selected stored operating system. For example, the stored operating system may be selected by querying a repository or other data store for an operating system having the selected driver installed. Additionally or alternatively, the selected driver may be installed on the operating system after the operating system has been selected by the operating system identification module 245-*a*. The selected operating system may also have one or more print server applications preinstalled. Additionally or alternatively, print server applications may be installed to the operating system after selection by the operating system identification module 245-*a*.

In certain examples, the selected operating system may be stored as a complete operating system image in a saved state. For example, in the saved state, the operating system may be executing a preinstalled print server application and have the selected driver preinstalled. In this way, the selected operating system may instantaneously provide a desired print server functionality once the operating system has been loaded to a host device. In other examples, one or more stored operating systems may include multiple source files that can be compiled or built into a compatible operating system for the selected driver based, thereby allowing for flexibility in customizing an operating system to meet a particular print server need.

The operating system loading module 725 may be configured to load the selected operating system to dynamically generate a print server associated with the print job. The selected operating system may be loaded to a virtual machine implemented by or within the host computer system 610-a. Additionally or alternatively, the selected operating system may be loaded to an external target device in communication with the selected printer to dynamically generate a print server implemented independent from the host computer system 610-a.

It should be understood that in certain examples, a print server may be dynamically generated for a print job in response to a determination that no other print server is available to handle the print job. For example, a print server may not be available to handle the print job if the print server is not running an operating system that is compatible with the selected driver, if the print server has an installed driver that conflicts with the selected driver, if the print server is not in communication with the selected printer, or if the print server is busy. Thus, the functionality of the operating system identification module 245-a and/or the operating system loading module 725 may in certain examples be triggered by a determination that no existing print server is available to process the print job.

FIG. 8A and FIG. 8B illustrate examples of tables 805, 810 that store relationships between various components of a system (e.g., system 100, 600 of FIG. 1 or 6). These relationships may be stored by a data store (e.g., data store 110 of FIG. 1 or 3) and used in the dynamic on-demand generation of print servers, according to the principles described with regard to the foregoing Figures. The tables 805, 810 may be examples of the tables 320 described above with reference to FIG. 3.

FIG. 8A shows a table 805 of associations between printers (e.g., printers 150 of FIG. 1 or 5), drivers (e.g., drivers 305 of FIG. 3), and operating systems (e.g., operating system images 320 of FIG. 3) in a system. In certain examples, the driver mapping module 715 of FIG. 7 and the operating system identification module 245-a of FIG. 2 or 7 may access the table 805 to identify a driver (e.g., driver 305 of FIG. 3) for a selected printer (e.g., printer 150 of FIG. 1 or 5) and an operating system associated with the driver.

As shown in FIG. 8A, the table 805 includes a first column for printers, a second column for drivers, and a third column for operating systems. Each horizontal row indicates a relationship between a printer, a driver, and an operating system. Thus, according to the table 805, a print job may be sent to printer A using driver $A_1$ or to printer C using driver $C_1$. As further shown in FIG. 8, certain drivers may be compatible with multiple operating systems, and other drivers may be compatible with a single operating system. For example, driver $A_1$ may be compatible with operating system X or operating system Y. However, driver $D_1$ may be compatible only with operating system Z.

FIG. 8B illustrates a table of compatibility among different drivers. In the present example, compatibility between two drivers is indicated by an "X" character and incompatibility between two drivers is indicated by an "O" character. If two drivers are incompatible with each other, it may be desirable not to install both drivers on the same machine or operating system at the same time.

In certain examples, the information in the tables 805, 810 of FIG. 8A and FIG. 8B may be used by a host computer system (e.g., the host computer system 610 of FIG. 6 or 7 or the central server computer system 105 of FIG. 1 or 5) to determine whether a print job is to be assigned to an existing print server or to a print server dynamically generated on-demand. For example, once a printer has been selected for the print job, table 805 may be consulted to identify an appropriate driver for that printer. The host computer system may then determine whether an existing print server is available to handle the print job by consulting table 805 to determine whether a print server with the appropriate operating system is in communication with the selected printer. If such a print server exists, the host computer system may consult table 810 to determine whether that print server has a driver installed that conflicts with the driver for the selected printer.

Thus, if an existing print server is in communication with the selected printer, is running the appropriate operating system for the driver, and does not have a conflicting driver installed, the existing print server may be assigned the print job. Otherwise, a new print server may be dynamically generated with the appropriate operating system and driver to handle the print job.

Figure 9:
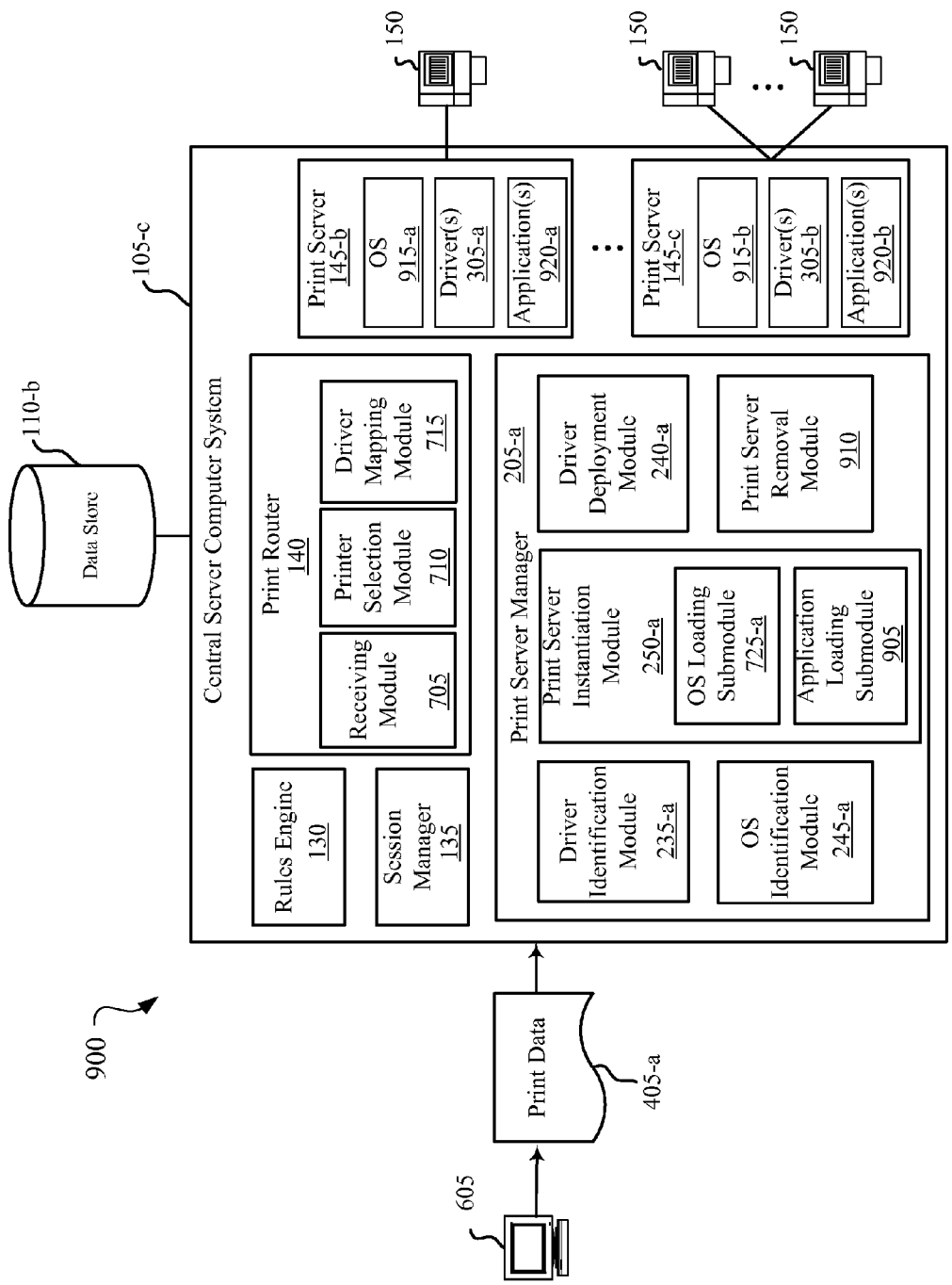
FIG. 9 is a diagram illustrating an example of a system for dynamic print server generation in a distributed printing environment, according to various embodiments of the invention.

Referring next to FIG. 9, an example of a system 900 for distributed printing is shown. The system 900 may be an example of the systems 100, 600 described above with reference to FIG. 1 or 6. The system 900 may include a device 605, a central server computer system 105-c, a data store 110-b, and printers 150. The central server computer system 105-c may be an example of the central server computer systems 105 described above with reference to FIG. 1 or 5 or the host computer system 610 described above with reference to FIG. 6 or 7. The data store 110-b may be an example of the data stores 110 described above with reference to FIG. 1 or 3, and the printers 150 may be an example of the printers described above with reference to FIG. 1 or 5. Each of these components may be in communication, directly or indirectly.

The device 605 may transmit print data 405-a for a print job to the central server computer system 105-c. The central server computer system 105-c may include a rules engine 130, a session manager 135, a print router 140-a, a print server manager 205-a, and a number of virtual print servers 145 that control the printers 150. The rules engine 130 and the session manager 135 may perform substantially the same functionality as described above with reference to FIG. 1.

The print router 140 may be an example of the print router 140 described above with reference to FIG. 1, 2, or 5. In this example, the print router 140 includes a receiving module 705, a printer selection module 710, and a driver mapping module 715. The receiving module 705 may receive a notification of a print job (e.g., the print data 405-a or another notification) and the printer selection module 710 may select a printer 150 for the print job. The driver mapping module 715 may map a driver 305 to the selected printer 150. The receiving module 705, the printer selection module 710, and the driver mapping module 715 may perform substantially the same functions as described above with respect to these same modules in the context of the host computer system 610-a of FIG. 6.

The print server manager 205-a may be an example of the print server manager 205-a described above with reference to FIG. 2. The print server manager 205-a of the present example includes a driver identification module 235-a, an operating system identification module 245-a, a print server instantiation module 250-a, a driver deployment module 240-a, and a print server removal module 910.

The driver identification module 235-*a* may identify the driver 305 selected by the driver mapping module 715 for the print job. For example, the driver identification module 235-*a* may communicate with the data store 110-*b* to locate the selected driver 305 in a repository of stored drivers 305 (e.g., stored drivers 305 of FIG. 3). The operating system identification module 245-*a* may select an appropriate operating system 915 for the driver 305 (e.g., from stored operating system images 330 of FIG. 3). For example, the operating system identification module 245-*a* may consult a table (e.g., table 805 of FIG. 8A) to identify an operating system 915 that is associated with the driver 305 mapped to the selected printer 150. In certain examples, the operating system identification module 245-*a* may select the operating system 915 by communicating with the data store 110-*b* to find a stored operating system that already includes the driver 305 mapped to the selected printer 150.

Once the appropriate operating system 915 has been identified, the print server instantiation module 250-*a* may dynamically generate a new virtual print server 145 for the print job in real time and on demand. To dynamically generate the new print server 145, an operating system loading submodule 725-*a* may load the operating system 915 associated with the driver 305 for the selected printer 150 to a virtual processing device implemented within the central server computer system 105-*c*.

The operating system loading submodule 725-*a* may communicate with the data store 110-*b* to retrieve the operating system 915 from a repository of stored operating systems (e.g., stored operating systems 330 of FIG. 3). The operating system 915 may be pre-built in the data store 110-*b*, or the operating system loading submodule 725-*a* may alternatively build the operating system 915 from various software components retrieved from the data store 110-*b*. In certain examples, the operating system 915 image loaded by the operating system loading submodule 725-*a* may already include applicable print server applications 920 to allow the virtual or real processing device to implement a print server 145.

Additionally or alternatively, an application loading submodule 905 may retrieve one or more stored print server applications from the data store 110-*b* and load (i.e., install) them to the newly generated print server 145. In still other examples, the operating system 915 may be a special-purpose operating system 915 that does not require the installation of additional print server applications 920 to implement print server 145 functionality.

The driver deployment module 240-*a* may install the driver 305 mapped to the selected printer 150 to the newly created print server 145. Alternatively, the driver 305 may be preinstalled on the operating system 915 image loaded by the operating system loading submodule 725-*a* when the print server 145 is created.

The new print server 145 may receive the print job, process the print job, and transmit the processed print job to the selected printer 150 using the appropriate driver 305. In response to a determination that the print job is complete, the print server removal module 910 may remove the print server 145 from the virtual processing device to free up the processing resources for new print servers 145 or other uses. Additionally or alternatively, the print server removal module 910 may allow the print server 145 to continue functioning and manage additional print jobs until it is determined that a removal condition is met. The removal condition may include, for example, a determination that the print server 145 has been inactive for at least a threshold amount of time. In additional or alternative examples, the removal condition may include a determination that a threshold amount of time has expired since the print server 145 was generated by the print server instantiation module 250-*a*. Moreover, any other removal condition may be used to trigger the print server removal module 910 as may suit a particular application of the foregoing principles.

Figure 10:
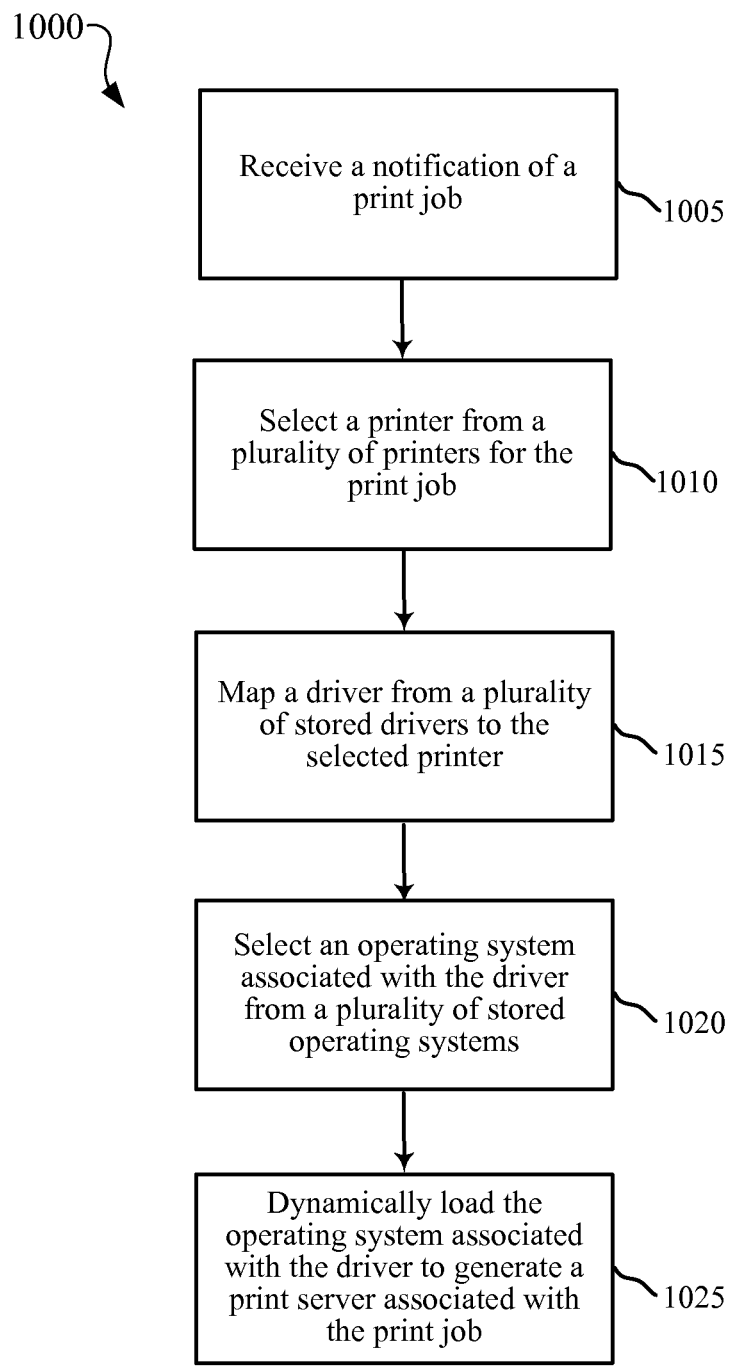
FIG. 10 is a flowchart diagram illustrating an example of a method of printing in a distributed printing environment, according to various embodiments of the invention.

Referring next to FIG. 10, a flow chart is shown illustrating an example of a method 1000 for printing in a distributed printing environment according to various embodiments of the invention. This method 1000 may, for example, be performed in whole or in part by the central server computer system 105 of FIG. 1, 2, 5, or 9, or the host computer system 610 of FIG. 6 or 7.

At block 1005, notification is received of a print job. At block 1010, a printer is selected from a plurality of printers for the print job. At block 1015, a driver is mapped from a plurality of stored drivers to the selected printer. At block 1020, an operating system associated with the driver is selected from a plurality of stored operating systems. At block 1025, the operating system associated with the driver is dynamically loaded to generate a print server associated with the print job.

Figure 11:
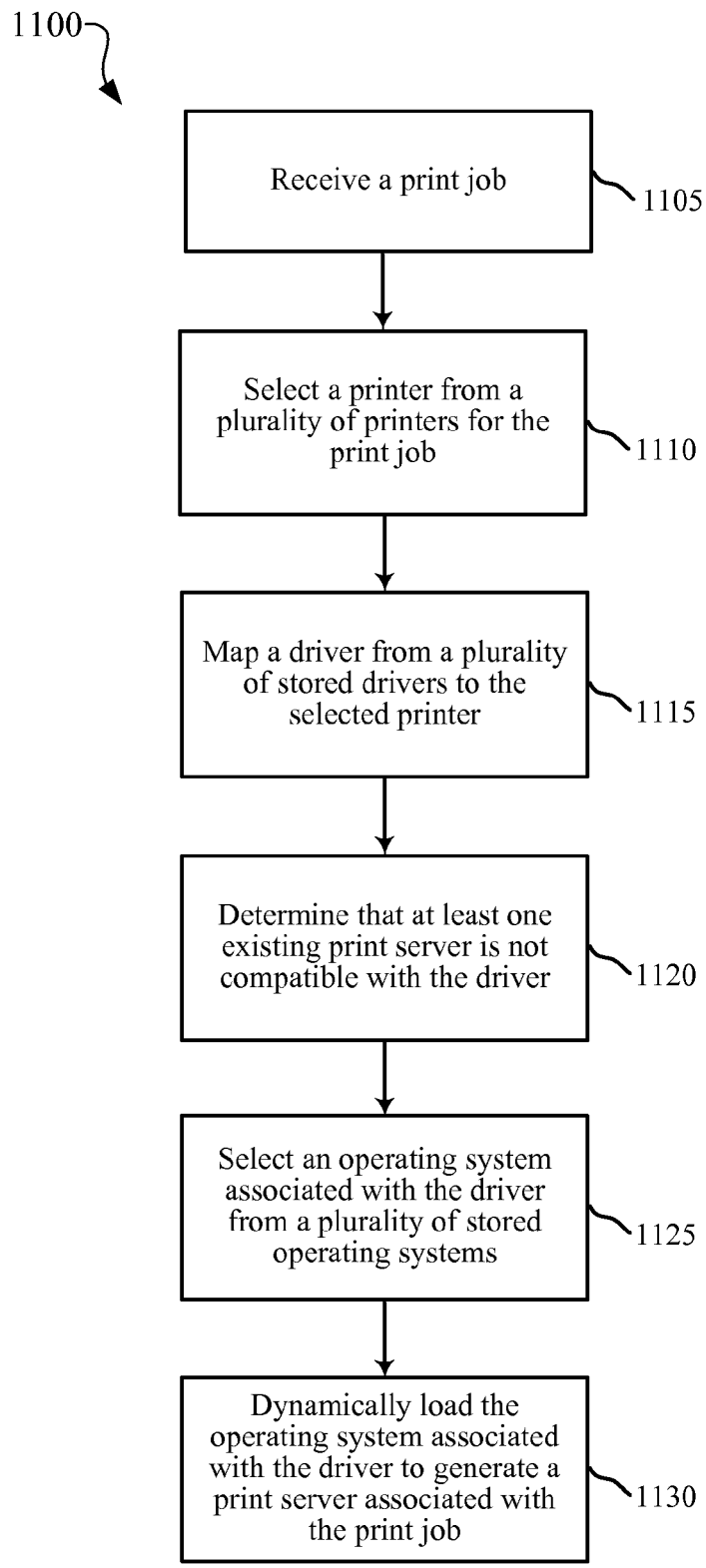
FIG. 11 is a flowchart diagram illustrating an example of a method of printing in a distributed printing environment, according to various embodiments of the invention.

Referring next to FIG. 11, a flow chart is shown illustrating an example of a method 1100 for printing in a distributed printing environment according to various embodiments of the invention. This method 1100 may, for example, be performed in whole or in part by the central server computer system 105 of FIG. 1, 2, 5, or 9, or the host computer system 610 of FIG. 6 or 7.

At block 1105, a print job is received. At block 1110, a printer is selected from a plurality of printers for the print job. At block 1115, a driver is mapped from a plurality of stored drivers to the selected printer. At block 1120, it is determined that at least one existing print server is not compatible with the driver. For example, the at least one existing print server may be determined to not be compatible with the driver if the at least one existing print server uses an operating system that is not supported by the driver for the print job or if the at least one existing print server has at least one installed driver that interferes or conflicts with the selected driver. At block 1125, an operating system associated with the driver is selected from a plurality of stored operating systems. At block 1130, the operating system associated with the driver is dynamically loaded to generate a print server associated with the print job.

Figure 12:
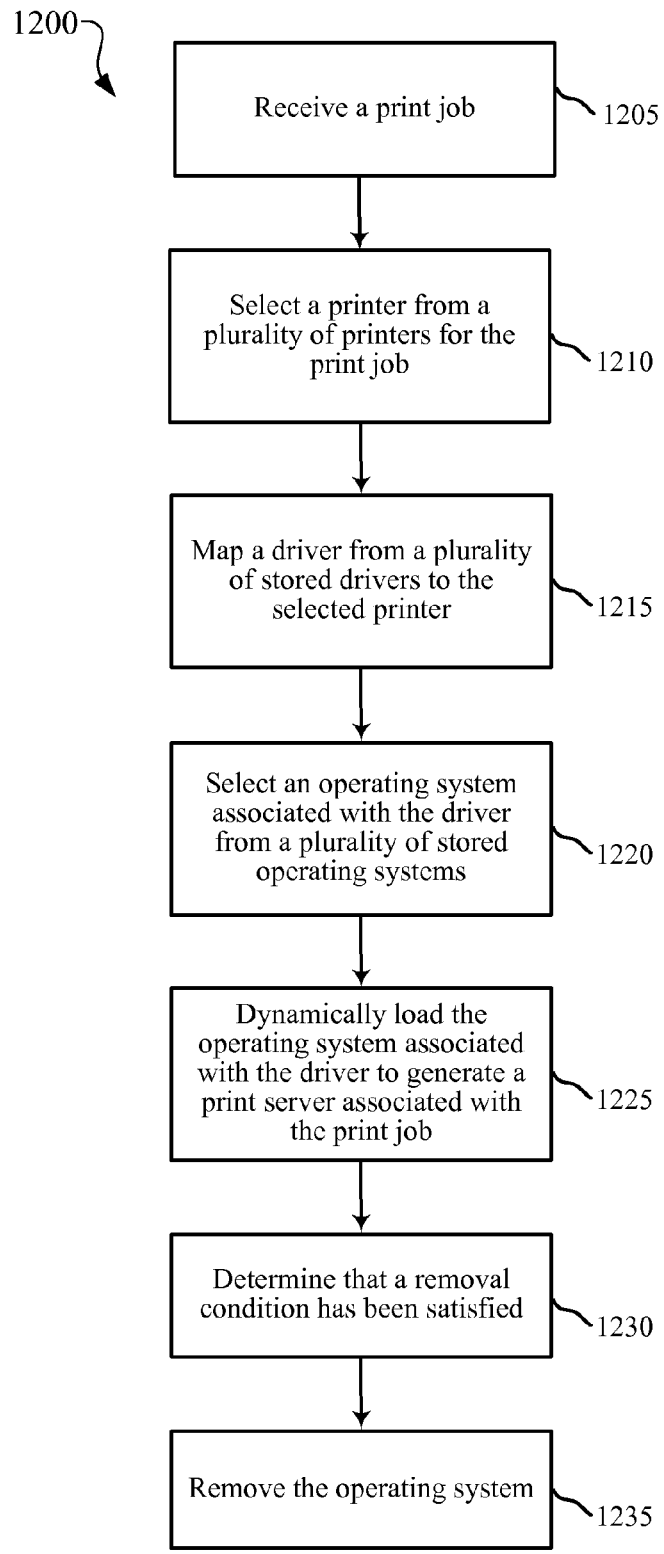
FIG. 12 is a flowchart diagram illustrating an example of a method of printing in a distributed printing environment, according to various embodiments of the invention.

Referring next to FIG. 12, a flow chart is shown illustrating an example of a method 1200 for printing in a distributed printing environment according to various embodiments of the invention. This method 1200 may, for example, be performed in whole or in part by the central server computer system 105 of FIG. 1, 2, 5, or 9, or the host computer system 610 of FIG. 6 or 7.

At block 1205, a print job is received. At block 1210, a printer is selected from a plurality of printers for the print job. At block 1215, a driver is mapped from a plurality of stored drivers to the selected printer. At block 1220, an operating system associated with the driver is selected from a plurality of stored operating systems. At block 1225, the operating system associated with the driver is dynamically loaded to generate a print server associated with the print job. At block 1230, a determination is made that a removal condition has been satisfied. The removal condition may include, for example, completion of the print job, the expiration of a threshold amount of time, and/or a threshold period of print server inactivity.

Figure 13:
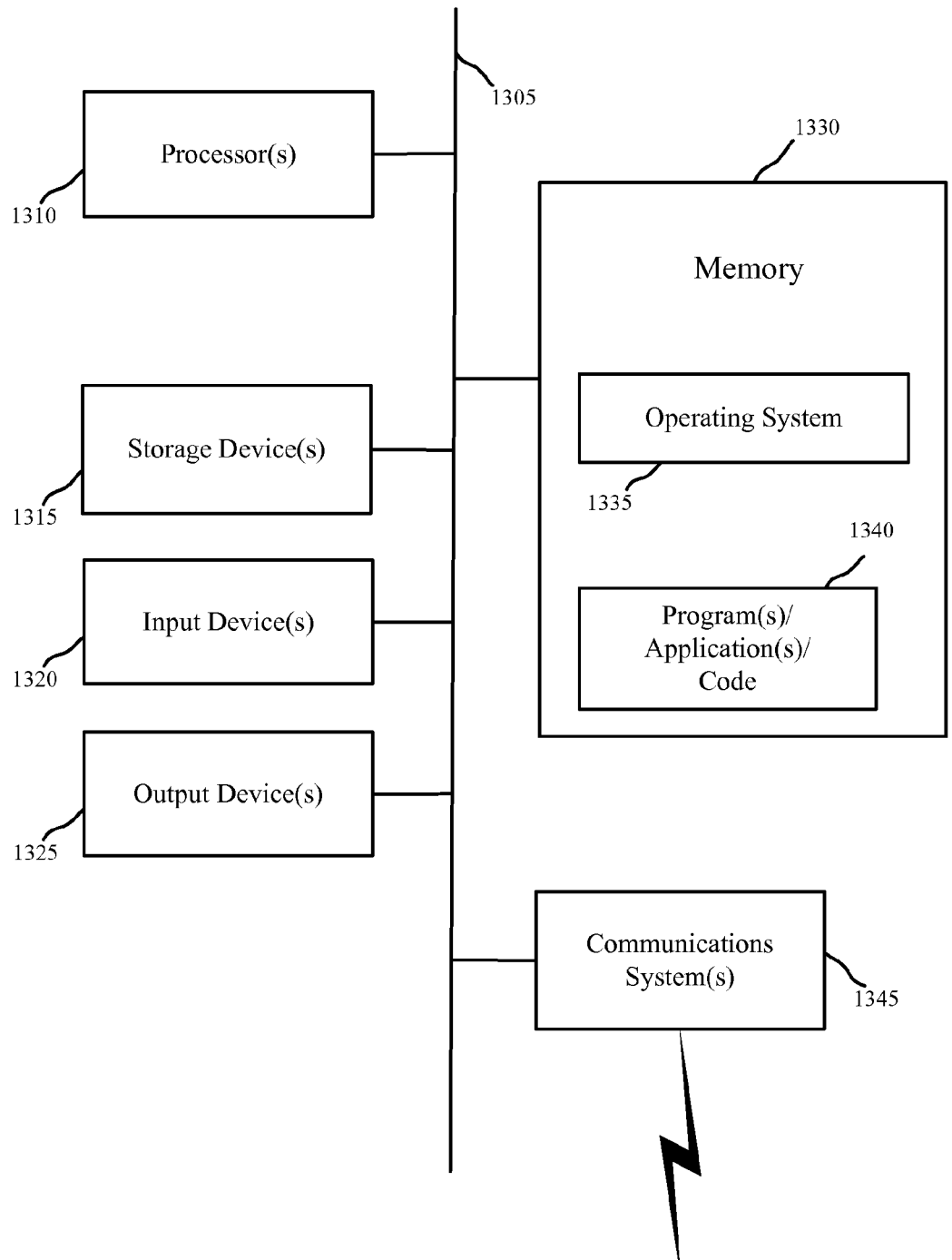
FIG. 13 is a schematic diagram that illustrates a representative device structure that may be used in various embodiments of the present invention

A device structure 1300 that may be used for one or more components of the central server computer system 105 of FIG. 1, 2, 5, or 9, the host computer system 610 of FIG. 6 or 7, the rules engine 130 of FIG. 1, 2, 5, or 9, the print router 140 of FIG. 1, 2, 5, or 9 the backend 120 of FIG. 1 or 4, the print server 145 of FIG. 1, 2, 5, or 6, or for other computing devices or printers described herein, is illustrated with the schematic diagram of FIG. 13.

This drawing broadly illustrates how individual system elements of each of the aforementioned devices may be implemented, whether in a separated or more integrated manner. Thus, any or all of the various components of one of the aforementioned devices may be combined in a single unit or separately maintained and can further be distributed in multiple groupings or physical units or across multiple locations. The example structure shown is made up of hardware elements that are electrically coupled via bus 1305, including processor(s) 1310 (which may further comprise a digital signal processor (DSP) or special-purpose processor), storage device(s) 1315, input device(s) 1320, and output device(s) 1325. The storage device(s) 1315 may be a machine-readable storage media reader connected to any machine-readable storage medium, the combination comprehensively representing remote, local, fixed, or removable storage devices or storage media for temporarily or more permanently containing computer-readable information. The communications system(s) interface 1345 may interface to a wired, wireless, or other type of interfacing connection that permits data to be exchanged with other devices. The communications system(s) interface 1345 may permit data to be exchanged with a network.

The structure 1300 may also include additional software elements, shown as being currently located within working memory 1330, including an operating system 1335 and other code 1340, such as programs or applications designed to implement methods of the invention. It will be apparent to those skilled in the art that substantial variations may be used in accordance with specific requirements. For example, customized hardware might also be used, or particular elements might be implemented in hardware, software (including portable software, such as applets), or both.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A distributed printing system, comprising:
a plurality of printers;
a data store comprising a plurality of stored operating systems; and
a central server computer system communicatively coupled to the data store, wherein the central server computer system is configured to:
receive a notification of a print job;
select a printer from the plurality of printers for the print job;
map a driver from a plurality of stored drivers to the selected printer;
select an operating system associated with the driver from the plurality of stored operating systems;
dynamically load the operating system associated with the driver to generate a print server associated with the print job; and
remove the operating system in response to at least one removal condition being satisfied.

2. The system of claim 1, wherein the central server computer system is further configured to:
dynamically load the operating system in real time in response to receiving the print job.

3. The system of claim 1, wherein the at least one removal condition comprises
a determination that the print job has completed.

4. The system of claim 1, wherein the at least one removal condition comprises
a determination that the print server has been inactive for a threshold amount of time.

5. The system of claim 1, wherein the central server computer system is further configured to:
select the operating system associated with the driver by determining that the operating system associated with the driver comprises the driver.

6. The system of claim 1, wherein the central server computer system is further configured to:
    install the driver on the operating system associated with the driver.

7. The system of claim 1, wherein the central server computer system is further configured to:
    load the operating system associated with the driver onto the central server computer system as a virtual machine.

8. A method of printing in a distributed printing environment, comprising
    receiving a notification of a print job;
    selecting a printer from a plurality of printers for the print job;
    mapping a driver from a plurality of stored drivers to the selected printer;
    selecting an operating system associated with the driver from a plurality of stored operating systems;
    dynamically loading the operating system associated with the driver to generate a print server associated with the print job; and
    removing the operating system in response to at least one removal condition being satisfied.

9. The method of claim 8, further comprising:
    dynamically loading the operating system in real time in response to receiving the print job.

10. The method of claim 8, further comprising:
    dynamically loading the operating system associated with the driver in response to a determination that at least one existing print server is not compatible with the driver.

11. The method of claim 8, wherein the at least one removal condition comprises
    a determination that the print job has completed.

12. The method of claim 8, wherein the at least one removal condition comprises
    an expiration of a threshold amount of time.

13. The method of claim 8, wherein the at least one removal condition comprises
    a determination that the print server has been inactive for a threshold amount of time.

14. The method of claim 8, further comprising:
    selecting the operating system associated with the driver by determining that the operating system associated with the driver comprises the driver.

15. The method of claim 8, further comprising:
    installing the driver on the operating system associated with the driver.

16. The method of claim 8, further comprising:
    loading the operating system associated with the driver to a virtual machine.

17. The method of claim 8, wherein the operating system associated with the driver comprises at least one preinstalled print server application.

18. A central server computer system, comprising:
    a processor communicatively coupled with a memory, wherein the memory comprises program code configured to cause the processor to:
    receive a notification of a print job;
    select a printer for the print job from a plurality of printers;
    map a driver from a plurality of stored drivers to the selected printer;
    select an operating system associated with the driver from a plurality of stored operating systems;
    dynamically load the operating system associated with the driver to generate a print server associated with the print job; and
    remove the operating system in response to at least one removal condition being satisfied.

19. The central server computer system of claim 18, wherein the program code is further configured to cause the processor to:
    dynamically generate the operating system in real time in response to receiving the print job.

20. The central server computer system of claim 18, wherein the program code is further configured to cause the processor to:
    dynamically load the operating system associated with the driver in response to a determination that at least one existing print server is not compatible with the driver.

* * * * *